United States Patent [19]

Ohshima et al.

[11] Patent Number: 5,154,905
[45] Date of Patent: Oct. 13, 1992

[54] METHOD FOR PRODUCING UNSINTERED CRISTOBALITE PARTICLES

[75] Inventors: Iwao Ohshima; Koichi Orii, both of Yokohama; Naotake Watanabe, Yokosuka; Yasumasa Yamaguchi, Yokohama, all of Japan

[73] Assignee: Nitto Chemical Industry Co., Ltd., Tokyo, Japan

[21] Appl. No.: 814,051

[22] Filed: Dec. 26, 1991

Related U.S. Application Data

[63] Continuation of Ser. No. 682,232, Apr. 9, 1991, abandoned.

[30] Foreign Application Priority Data

Apr. 10, 1990 [JP] Japan .................................. 2-093063
Mar. 25, 1991 [JP] Japan .................................. 3-082877

[51] Int. Cl.$^5$ .......................... C01B 33/12; C03C 3/06
[52] U.S. Cl. .................................... 423/335; 423/338; 501/4; 501/54; 501/133
[58] Field of Search ............... 423/335, 338; 501/4, 501/54, 133

[56] References Cited

U.S. PATENT DOCUMENTS

| | | | |
|---|---|---|---|
| 4,683,128 | 7/1987 | Orii et al. | |
| 4,786,017 | 11/1988 | Wegerhoff et al. | 501/4 X |
| 4,826,521 | 5/1989 | Wiechmann et al. | 501/4 X |
| 4,853,198 | 8/1989 | Orii et al. | |

FOREIGN PATENT DOCUMENTS 0173961 3/1986 European Pat. Off. .
3-8708 1/1991 Japan .

Primary Examiner—Karl Group
Attorney, Agent, or Firm—Cushman, Darby & Cushman

[57] ABSTRACT

A method for producing a nonsintered cristobalite particles comprising heating amorphous silica particles at a temperature of 1400° to 1700° C. in the presence of cristobalite particles (hereinafter referred to as cristobalite particles for addition and mixing) of at least 5 parts by weight based on 100 parts by weight of said amorphous silica particles to convert said amorphous silica particles to cristobalite particles with their particle form kept unchanged. According to the present invention, dense cristobalite having a low alkali content can be obtained in the form of particles. Such cristobalite is used as a filler, a dispersing agent, etc., and also as a material for high-quality artificial quartz, ceramics, etc., and particularly as a material for transparent quartz glass because of its generating no bubbles at the time of melt-molding.

16 Claims, No Drawings

METHOD FOR PRODUCING UNSINTERED CRISTOBALITE PARTICLES

This is a continuation of application Ser. No. 07/682,232, filed on Apr. 9, 1991, which was now abandoned.

BACKGROUND OF THE INVENTION

1. Field of the Invention

The present invention relates to a method for producing unsintered cristobalite particles.

2. Description of the Prior Art

Generally, transparent quartz glass is produced by vitrification of silica particles by heat-fusing. The form of heat-fusing includes the Verneuil's method of fusing silica particles with argon-oxygen plasma flame or oxyhydrogen flame, and the vacuum fusion method of heat-fusing silica packed in a container under high vacuum.

Hitherto, natural rock crystal has been used as a material for transparent quartz glass. At present, with an increase in the integration degree of LSI in the field of semiconductor, it is being severely required for raw materials used therefor to have a higher purity, but good-quality natural rock crystal is being exhausted. Studies intended to substitute synthetic high-purity silica for natural rock crystal are now made as a countermeasure therefor.

However, when amorphous synthetic high-purity silica is used as a material in the above method, the quartz glass obtained has a problem of containing many bubbles, because although this silica is of high purity, complete removal of bubbles contained in it is very difficult. This is thought to result from the silica, a material, being porous and short of denseness.

As one of the methods to solve this problem, it is proposed to use amorphous synthetic silica after converted to cristobalite having a dense structure, for example, as disclosed in EP-A2-0173961.

By the above method, transparent quartz glass containing no bubbles can be obtained even with amorphous synthetic silica.

In the conventional method, however, an alkali metal component is added in large amounts when amorphous synthetic silica is converted to cristobalite, so that the alkali metal component remains in considerable amounts even after vitrification, which becomes a problem of quality for high-purity quartz glass. Removal of the alkali component is difficult because it requires prolonged heat-treatment. Also, cristobalite obtained by the conventional method has a form of sintered boy, so that there is a problem that the cristobalite itself is not suited to use as a material for the Verneuil's method.

SUMMARY OF THE INVENTION

An object of the present invention is to provide a method for producing highly dense, unsintered and particle-form cristobalite in good efficiency and economically.

The method of the present invention converts amorphous silica, a material, to cristobalite without causing an alkali metal to substantially exist in the amorphous silica, so that cristobalite having a small amount of the alkali component is obtained. The cristobalite thus obtained can be used as a material for obtaining transparent quartz glass without any dealkalization treatment.

According to the present invention, since cristobalite can be obtained in the form of not a sintered body, but a particle, the cristobalite obtained can be used as it is as a material, for example, for obtaining transparent quartz glass by the Verneuil's method without requiring pulverization treatment.

In the present invention, unsintered and high-purity cristobalite particles having an extremely small amount of impurities can be obtained by properly selecting silica used as a material.

The present invention can also be used to convert multi-component amorphous silica containing various elements to unsintered and highly dense particles depending upon uses.

The present inventors have extensively studied to solve the foregoing problems of the conventional method, and have found that by heating amorphous silica particles in the presence of cristobalite particles, the amorphous silica particles can surprisingly be converted to unsintered and particle-form cristobalite without causing an alkali metal to substantially exist in the amorphous silica particles. The present inventors thus completed the present invention.

The gist of the present invention is a method for producing unsintered cristobalite particles comprising heating amorphous silica particles at a temperature of 1400° to 1700° C. in the presence of cristobalite particles of at least 5 parts by weight based on 100 parts by weight of the amorphous silica particles to convert the amorphous silica particles to cristobalite particles with their particle form kept unchanged.

According to the present invention, dense cristobalite having a low alkali content can be obtained in the form of particles.

Further, by properly selecting silica used as a material, unsintered and dense cristobalite particles can be obtained which is of high purity because the amount of contained impurities such as aluminum, titanium and alkali metals, etc. is extremely small, and yet of which the particle size has been controlled in a range of 20 μm to 5 mm.

Cristobalite obtained by the present invention is used as a filler, a dispersing agent, etc., and also can preferably be used as a material for high-quality artificial quartz, ceramics, etc., and particularly as a material for transparent quartz glass because of its generating no bubbles at the time of melt-molding.

Further, the present invention, in addition to the above advantages, has also an advantage that the manufacturing cost can be reduced as compared with the conventional method.

DESCRIPTION OF THE PREFERRED EMBODIMENTS

The present invention comprises the following two steps.

STEP 1 (STEP FOR PREPARING A MATERIAL FOR HEATING)

A material for heating is prepared by mixing amorphous silica particles, a material, and cristobalite particles of at least 5 parts by weight based on 100 parts by weight of the former.

STEP 2 (STEP FOR CONVERSION TO CRISTOBALITE)

The above material for heating is heated in one stage at a temperature of 1400° to 1700° C. to obtain silica, partially or completely converted to cristobalite, in the form of unsintered particles.

The above steps will be explained below in order.

STEP 1 (STEP FOR PREPARING A MATERIAL FOR HEATING)

Amorphous silica, a material, used in the present invention may be produced by any method, its manufacturing method being not limited.

The particle size of amorphous silica used in the present invention is not critical. However, when silica converted to cristobalite is used as a material for producing transparent quartz glass by the flame fusion method, too a small particle size of the silica causes problems in terms of processability and productivity. Too a large particle size thereof makes homogeneous fusion difficult. Consequently, the particle size is in a range of 10 μm or more, preferably 20 μm to 5 mm, more preferably 50 to 400 μm from the standpoint of practical use.

Preferred silica used as a material for producing transparent quartz glass used in the field of semiconductor is one having as low an impurity content as possible. It is desirable that the amount of any one of aluminum, phosphorus, boron, alkali metal elements and transition metal elements (e.g. Ti, Cr, Fe, Cu, Mo) contained as impurities is 1 ppm or less.

Natural rock crystal so far used generally has a high aluminum content, which usually exceeds 10 ppm. Aluminum is an element which is difficult to remove, its removal being difficult even by heat treatment, extraction with acids, etc. Consequently, synthetic silica having a low aluminum content is advantageous as a material for producing high-purity quartz glass for use in the field of semiconductor.

For this reason, preferred amorphous silica used in the present invention is one in which the amount of any one of aluminum, titanium and an alkali metal is 1 ppm or less.

Such a silica can be obtained by the methods previously proposed by the present inventors, these methods being disclosed, for example, in U.S. Pat. No. 4,683,128.

According to the above methods, the desired silica can be obtained by extruding an aqueous alkali silicate solution having a viscosity of 2 to 500 poises through a nozzle of 1 mm or less in hole diameter into a coagualtion bath comprising a water-soluble organic medium or an acid solution having a concentration of 4N or less to coagulate the solution, treating the resulting fibrous or pillar-shaped gel with an acid-containing solution and then washing the gel with water to remove impurities by extraction and, if necessary, heat-treating the silica thus obtained at a temperature of 1000° C. or more.

Amorphous silica obtained with silicon tetrachloride or silicic acid alkoxide as a material also can be used.

When there is a necessity to adjust the particle size of silica used as a material, the common pulverization apparatus can be used. The apparatus includes, for example, rolling ball mills such as pot mills, tube mills, conical ball mills, compartment mills, etc., vibrating ball mills and medium-stirring mills such as tower-type pulverizers, stirring vessel-type mills, etc. Among these, rolling ball mills and vibrating ball mills are preferably used.

As to a material for the main part, brought into contact with the material to be pulverized, of the pulverization apparatus, or a material for pulverization media such as balls, rods, etc. used as need arises, it will suffice in usual cases to properly select the material from alumina, zirconia or plastics-lined steel, silicon carbide, silicon nitride, etc. When contamination with aluminum, zirconium, etc. is not desirable, it will suffice to properly select the above material from silicate materials such as quartz glass, fused quartz, rock crystal, agate, quartzite, etc.

As to the size of the pulverization medium comprising a rigid body such as balls used as need arises, the diameter is in a range of 0.5 to 50 mm, preferably 10 to 40 mm.

In the present invention, the amorphous silica particles are heat-treated in the presence of the cristobalite particles of at least 5 parts by weight based on 100 parts by weight of the former. Such cristobalite particles for addition to and mixing with the amorphous silica particles are hereinafter referred to as cristobalite particles for addition and mixing.

When the amount of such the cristobalite particles based on 100 parts by weight of the amorphous silica particles is less than 5 parts by weight, opportunity of contact between the amorphous silica particles increases, so that the silica particles turn massive sintered body by heat-treatment. Thus, the desired unsintered cristobalite particles according to the present invention cannot be obtained. On increasing the amount of the cristobalite particles for addition and mixing, the unsintered cristobalite particle is easy to obtain, but the proportion of the amorphous silica particles, a material, to be converted to cristobalite relatively lowers. Consequently, to increase the amount of the cristobalite particles for addition and mixing too much is not desirable in terms of production efficiency.

From this, the amount of the cristobalite particles for addition and mixing is in a range of 5 to 400 parts by weight, preferably 10 to 100 parts by weight and more preferably 20 to 70 parts by weight based on 100 parts by weight of the amorphous silica particles used as a material.

The cristobalite particles for addition and mixing may be obtained by any method, its manufacturing method being not limited.

It is desirable for the cristobalite particles for addition and mixing to have a particle size of 5 mm or less. As the particle size becomes smaller, the area of contact with the amorphous silica particles more increases, so that the amount added can be reduced. Finely divided particles of less than 10 μm in particle size tend to aggregate, and therefore a sintering-preventing effect lowers with such the finely divided particles alone. For this reason, preferred cristobalite particles for addition and mixing is such finely divided particles that their particle size is in a range of preferably 10 to 400 μm, more preferably 10 to 200 μm, though these cristobalite particles may contain finely divided particles of less than 10 μm in particle size in substantially ignorable amounts.

As to the impurity content of the cristobalite particles for addition and mixing, the amount of any one of aluminum, titanium and an alkali metal contained is preferably 1 ppm or less like the amorphous silica particle used as a material, although it depends upon uses.

Such the cristobalite can be obtained by the method previously proposed by the present inventors, the method being disclosed, for example, in U.S. Pat. No. 4,853,198.

Again, in the present invention, when the amorphous silica particle, a material, is heat-treated in the presence of cristobalite particles, a predetermined amount of the cristobalite particles are added to and mixed with the amorphous silica particles, and then the mixture is heat-treated.

In order to enhance effects of the present invention, it is preferred to use a amorphous silica having substantially no attached water and decreased amounts of a silanol group, obtained by subjecting the silica to a preliminary heat-treatment such as for example drying or baking, etc.

The decrease of amorphous silica, a material, in moisture content prevents the material of the furnace from deterioration caused by heat-treatment at the step for conversion to cristobalite and prevents the productivity from lowering. Further, decrease in silanol group content can shift a sintering initiating temperature of amorphous silica to a high temperature region, which is effective for the prevention of sintering.

Percent weight reduction after heat-baking at 1200° C. for 4 hours (based on baked silica) can be used as an index for silanol group concentration of amorphous silica, which is hereinafter referred to as p.w.r.

In order to further enhance the effects of the present invention, it is preferred to use amorphous silica particles having a p.w.r. of 1% or less, preferably 0.5% or less, more preferably 0.1% or less. Such amorphous silica particles having a low p.w.r. can be prepared by preliminarily heat-treating amorphous silica in a temperature region of 1000-1300° C.

STEP 2 (STEP FOR CONVERSION TO CRISTOBALITE)

For converting amorphous silica to cristobalite, the cristobalite particles and amorphous silica particles in a predetermined weight ratio are mixed and heat-treated in a temperature range of 1400° to 1700° C., preferably 1450° to 1650° C., and more preferably 1500° to 1600° C.

Heat-treatment time at this step is in a range of 1 hour or more, preferably 2 to 30 hours.

In the present invention, since a nucleating agent (e.g. alkali metals) for promoting the conversion of amorphous silica to cristobalite is not used, amorphous silica is converted to cristobalite by heating it at a high temperature region.

A rate at which amorphous silica is converted to cristobalite becomes high as the heating temperature is raised. However, when the amorphous silica is heat-treated in the absence of the cristobalite particles as in the conventional method, the silica particles melt at the surface and adhere to one another at a temperature region exceeding 1300° C., thereby coming to show a strong sintering property. Thus, cristobalite obtained turns hard and massive sintered body.

When such the sintered cristobalite is used as a material for producing transparent quartz glass by the flame fusion method, it requires re-pulverization. In this case, the cristobalite is contaminated with impurities from the pulverizer, and broken surfaces newly produced by the pulverization treatment take an unstable structure. Quartz glass obtained by fusing such the cristobalite contains many bubbles and has a high impurity content, so that it is not preferred in terms of quality.

It is known that cristobalite does not sinter at a temperature region below 1725° C. which is the melting point thereof. It was however unexpected that when the cristobalite particles are caused to exist in a small amount based on the amorphous silica particles, a sintering-preventing effect is obtained. In the present invention, the cristobalite particles for addition and mixing are thought to bring about an effect to reduce the opportunity of direct contact between the amorphous silica particles at the time of heat-treatment for converting the amorphous silica particles to cristobalite ones.

As material for the container holding silica, which is a material, at the time of heat-treatment, those which withstand high temperatures and yet contain neither a binder nor a sintering assistant are preferred. Particularly, quartz is desirable.

In the present invention, the atmosphere in which the heat-treatment is carried out may be any one of air, oxygen, carbon dioxide, etc. Also, inert gases such as nitrogen, argon, helium, etc. may be used. Further, the heat-treatment may be carried out in vacuo.

Apparatus used at the time of heat-treatment may be any one of those which can keep silica, a material, at a predetermined temperature. For example, a tubular furnace, box-type furnace and tunnel-type furnace can be used. For heating the furnace, any one of electric heat, combustion gas, etc. may be used.

The present invention will be illustrated specifically with reference to the following examples and comparative examples, but the present invention is not to be construed as being limited thereto.

EXAMPLE 1

1-1 PREPARATION OF AMORPHOUS SILICA PARTICLES

1-1-1 PREPARATION OF DRY SILICA

Water glass JIS No. 3 was concentrated by heating until its viscosity at 20° C. was 300 cps. About 8 liters of this water glass was extruded, while applying pressure thereto with a pump, through a filter (opening size, 70 $\mu$m) and then a nozzle (hole diameter, 0.2 mm; number of holes, 50) into a coagulation bath, at a rate of 0.7 m/sec, containing 300 liters of a 8 wt. % aqueous sulfuric acid solution kept at 50° C.

The fibrous silica obtained was immersed in a newly prepared 8 wt. % aqueous sulfuric acid solution of 10 times the weight of the silica, and impurities were extracted while stirring for about 1 hour at a temperature of about 95° C. Thereafter, the silica was washed twice with pure water of 10 times its weight.

After the above extraction and washing operation was repeated five times, the silica was dehydrated with a centrifuge, and the resulting wet silica was dried at 150° C. for 8 hours on a hot-air drier to obtain 3.7 kg of amorphous dry silica having a moisture content of 7 wt. % (percent weight reduction based on baked silica).

1-1-2 PREPARATION OF AMORPHOUS BAKED SILICA

Two kilograms of the above dry silica was put in a quartz crucible and subjected to 2 hours' preliminary heat-treatment at a temperature of 1250° C. in an electric furnace to obtain 1.86 kg of amorphous baked silica.

The baked silica thus obtained was pulverized with a nylon ball mill and classified with a nylon sieve to obtain 1.37 kg of amorphous baked and classified silica particles having a particle size ranging from 75 to 300 $\mu$m.

1-2 PREPARATION OF CRISTOBALITE PARTICLES FOR ADDITION AND MIXING 1.7 Kilograms of the dry silica obtained in paragraph 1-1-1 was pulverized and classified according to paragraph 1-1-2 except that no baking treatment was carried out, to obtain 1.2 kg of dry classified silica particles having a particles size ranging from 75 to 300 $\mu$m.

1.2 Kilograms of the above dry classified silica particles were immersed in a mixed solution, kept at a temperature of 50° C., of 35 ml of a 1/10N aqueous NaOH solution and 4965 ml of pure water and subjected to alkali impregnation treatment at 50° C. for 1 hour with stirring. After the alkali impregnation treatment, the liquid portion was separated on a centrifuge, and the resulting Na-impregnated silica (Na, 30 ppm) was dried overnight at 150° C.

326 Grams of the Na-impregnated silica thus obtained was placed in a quartz crucible and heated at 1200° C. for 2 hours and then at 1400° C. for further 5 hours.

The silica obtained was of a particle form having a particle size ranging from 60 to 240 μm and had a true specific gravity of 2.33. This silica was confirmed to be cristobalite by an X-ray diffraction test. The impurity content was as follows: Al, 0.6 ppm; Ti, 0.2 ppm; Na, 0.2 ppm; K, 0.1 ppm or less; and Li, 0.1 ppm or less.

1-3 CONVERSION OF AMORPHOUS SILICA TO CRISTOBALITE

140 Grams of the amorphous baked and classified silica particles obtained in paragraph 1-1-2 and 60 g of the cristobalite particles obtained in Section 1-2 were mixed, placed in a quartz crucible (volume, 1 liter) and heat-treated at 1600° C. for 4 hours in an argon atmosphere. In the heat-treatment, a graphite crucible was used to hold the quartz crucible.

The silica obtained was of a particle form having a particle size ranging from 75 to 300 μm and had a true specific gravity of 2.33. This silica was confirmed to be cristobalite by an X-ray diffraction test. The impurity content was as follows: Al, 0.2 ppm; Ti, 0.2 ppm; Na, 0.1 ppm or less; K, 0.1 ppm or less; Li, 0.1 ppm or less; and U, 0.05 ppb or less.

Using the cristobalite particles thus obtained, the ingot of quartz glass was prepared by the Verneuil's method to find that it contained no bubbles. Thus, transparent quartz glass containing few impurities was obtained.

COMPARATIVE EXAMPLE 1

200 Grams of the amorphous baked and classified silica particles obtained in paragraph 1-1-2 of Example 1 was heat-treated in the same manner as in Section 1-3 of Example 1 except that the cristobalite particles were not added.

The silica obtained was a hard and sintered mass. This massive silica was pulverized with an alumina ball mill and classified on a stainless steel sieve to obtain 140 g of silica particles having a particle size ranging from 75 to 300 μm.

The silica particles obtained had a true specific gravity of 2.33 and was confirmed to be cristobalite by an X-ray diffraction test. Its impurity content was as follows: Al, 10 ppm; Ti, 0.2 ppm; Na, 1.2 ppm; K, 0.2 ppm; Li, 0.1 ppm or less; and U, 0.05 ppb or less. It can be seen that Al, Na and K contents increased.

Using the cristobalite particles thus obtained, the ingot of quartz glass was prepared by the Verneuil's method to find that it contained a large number of bubbles.

EXAMPLE 2 AND COMPARATIVE EXAMPLE 2

The amorphous baked and classified silica particles obtained in paragraph 1-1-2 of Example 1 and the cristobalite particles obtained in Section 1-2 of Example 1 were mixed with the amount of the latter based on 100 parts by weight of the former being varied as shown in Table 1. 100 Grams each of the resulting mixtures were heat-treated in the same manner as in Section 1-3 of Example 1.

Every silica thus obtained had a true specific gravity of 2.33 and was confirmed to be cristobalite by an X-ray diffraction test. The impurity content of the silica obtained in every Run Nos. was as follows: Al, 0.2 ppm; Ti, 0.2 ppm; Na, 0.1 ppm or less; K, 0.1 ppm or less; Li, 0.1 ppm or less; and U, 0.05 ppb or less.

Table 1 shows the state of respective silica after heat-treatment and the presence and absence of bubbles in the ingot of quartz glass prepared by the Verneuil's method using cristobalite obtained. In Comparative Example 2, an ingot was prepared after pulverizing the massive silica obtained by the heat-treatment in the same manner as in Comparative Example 1.

TABLE 1

| | Run No. | Weight ratio (part by weight) Amorphous silica | Cristobalite | State of silica after heat-treatment | Presence and absence of bubbles in ingot |
|---|---|---|---|---|---|
| Example 2 | 1 | 100 | 5.3 | Particle-form | Absent |
| | 2 | 100 | 17.6 | Particle-form | Absent |
| | 3 | 100 | 100 | Particle-form | Absent |
| | 4 | 100 | 400 | Particle-form | Absent |
| Comparative Example 2 | | 100 | 4 | Massive | Many bubbles present |

EXAMPLE 3

Mixtures of 100 parts by weight of the amorphous baked and classified silica particles obtained in paragraph 1-1-2 of Example 1 and 40 parts by weight of the cristobalite particles obtained in respective Run No. of Example 2 were prepared. 100 Grams each of the resulting mixtures were heat-treated for 4 hours at varying temperatures shown in Table 2 by the method according to Section 1-3 of Example 1.

Every silica obtained was of a particle form having a particle size ranging from 75 to 300 μm and was confirmed to be converted to cristobalite by an X-ray diffraction test. The impurity content of every silica was as follows: Al, 0.2 ppm; Ti, 0.2 ppm; Na, 0.1 ppm or less; K, 0.1 ppm or less; Li, 0.1 ppm or less; and U, 0.05 ppb or less.

Table 2 shows the true specific gravity of each silica and the conversion to cristobalite of the silica.

TABLE 2

| | | Silica after heat-treatment | |
|---|---|---|---|
| Run No. | Heat-treatment temperature (°C.) | True specific gravity | Conversion to cristobalite (%) |
| 1 | 1400 | 2.24 | 14 |
| 2 | 1500 | 2.28 | 50 |
| 3 | 1650 | 2.33 | 100 |

TABLE 2-continued

| Run No. | Heat-treatment temperature (°C.) | Silica after heat-treatment | |
|---|---|---|---|
| | | True specific gravity | Conversion to cristobalite (%) |
| 4 | 1700 | 2.33 | 100 |

The conversion to cristobalite was measured as follows.

To the silica obtained in Run No. 4 of Example 3, of which the conversion to cristobalite was made to be 100%, was added a known amount of the amorphous silica to prepare various samples having different proportions of crystalline silica. Every sample was subjected to an X-ray diffraction test to measure a peak height at $2\theta = 21.9°$. Using the data obtained, a calibration curve showing a relationship between the peak height and the proportion (wt. %) of crystalline silica in the sample, was prepared.

The silica after heat-treatment obtained in every Run No. of this Example was subjected to an X-ray diffraction test, and the conversion to cristobalite to every sample was obtained from the foregoing calibration curve.

Using the silica particles converted to cristobalite thus obtained, the ingot of quartz glass was prepared by the Verneuil's method to find that every ingot contained no bubbles.

EXAMPLE 4

Various amorphous baked and classified silica particles having different particle size ranges were prepared by carrying out a pulverization-classification treatment under varying conditions according to the method of paragraph 1-1-2 of Example 1. 100 Parts by weight of each silica particle thus obtained and 40 parts by weight of the cristobalite particles obtained each in respective Run Nos. of Example 3 were mixed, and 100 g each of the mixtures obtained were heat-treated at 1600° C. for varying hours shown in Table 3 in an argon atmosphere according to Section 1-3 of Example 1.

Every silica thus obtained was confirmed to be converted to cristobalite by an X-ray diffraction test. Its impurity content was as follows: Al, 0.2 ppm; Ti, 0.2 ppm; Na, 0.1 ppm or less; K, 0.1 ppm or less; Li, 0.1 ppm or less; and U, 0.05 ppb or less.

Table 3 shows the particle size range and true specific gravity of each silica obtained, and the conversion to cristobalite of the silica measured in the same manner as in Example 3.

TABLE 3

| Run No. | Heat-treatment time (hr) | Silica after heat-treatment | | |
|---|---|---|---|---|
| | | Particle size range (μm) | True specific gravity | Conversion to cristobalite (%) |
| 1 | 1 | 75–300 | 2.25 | 20 |
| 2 | 2 | 53–250 | 2.28 | 50 |
| 3 | 6 | 105–500 | 2.33 | 100 |
| 4 | 12 | 44–1000 | 2.33 | 100 |

Using the cristobalite particles thus obtained, the ingot of quartz glass was prepared by the Verneuil's method to find that every ingot contained no bubbles.

EXAMPLE 5

Mixtures of 100 parts by weight of the amorphous baked and classified silica particles obtained in paragraph 1-1-2 of Example 1 and 40 parts by weight of the cristobalite particles obtained each in respective Run Nos. of Example 4 were prepared. 100 Grams each of the resulting mixtures were heat-treated at 1600° C. for 4 hours in the varying atmospheres shown in Table 4 according to Section 1-3 of Example 1.

Every silica obtained was of a particle form having a particle size ranging from 75 to 300 μm and had a true specific gravity of 2.33. Every silica was confirmed to be cristobalite by an X-ray diffraction test. Its impurity content was as follows: Al, 0.2 ppm; Ti, 0.2 ppm; Na, 0.1 ppm or less; K, 0.1 ppm or less; Li, 0.1 ppm or less; and U, 0.05 ppb or less.

Using the cristobalite particles thus obtained, the ingot of quartz glass was prepared by the Verneuil's method to find that every ingot contained no bubbles.

TABLE 4

| Run No. | Heat-treatment atmosphere |
|---|---|
| 1 | Air |
| 2 | Helium |
| 3 | Nitrogen |
| 4 | Vacuum ($10^{-2}$ mmHg) |

EXAMPLE 6 AND COMPARATIVE EXAMPLE 3

The dry silica obtained in the same manner as in paragraph 1-1-1 of Example 1 was subjected to preliminary heat-treatment under various conditions shown in Table 5 to obtain amorphous silica having different p.w.r. These amorphous silica is pulverized and classified according to paragraph 1-1-2 of Example 1. 100 Parts by weight of each of various amorphous silica particles thus obtained and 40 parts by weight of the cristobalite particles obtained each in respective Run Nos. of Example 5 were mixed. 100 Grams each of the resulting mixtures were heat-treated in the same manner as in Section 1-3 of Example 1.

Every silica obtained was of a particle form having a particle size ranging from 75 to 300 μm and a true specific gravity of 2.33. The conversion to cristobalite measured by an X-ray diffraction test was 100%. The impurity content of every silica was as follows: Al, 0.3 ppm; Ti, 0.2 ppm; Na, 0.1 ppm or less; K, 0.1 ppm or less; Li, 0.1 ppm or less; and U, 0.05 ppb or less.

TABLE 5

| | Run No. | Preliminary heat-treatment condition (temp. °C. × hr) | p.w.r. (%) | State of silica after heat-treatment |
|---|---|---|---|---|
| Example 6 | 1 | 1100 × 2 | 0.2 | Particle-form |
| | 2 | 1050 × 2 | 0.5 | Particle-form |
| | 3 | 1000 × 2 | 1 | Particle-form |
| Comparative Example 3 | | 600 × 4 | 3 | Massive |

Using the cristobalite particles thus obtained, the ingot of quartz glass was prepared by the Verneuil's method to find that every ingot of Example 6 contained no bubbles. To the contrary, an ingot prepared from particles obtained by pulverizing the massive silica of Comparative Example 3 in the same manner as in Comparative Example 1 contained many bubbles.

EXAMPLE 7

A commercially available alkoxide series silica (Quartron GL produced by Tonen Petrochemical Co., Ltd.) was pulverized and classified so that the particle size may be in a range of 75 to 300 μm, and subjected to a preliminary heat-treatment at 1250° C. for 2 hr to obtain amorphous silica particles. A mixture of 100 parts by weight of these amorphous silica particles and 40 parts by weight of the cristobalite particles obtained in the same manner as in Section 1-2 of Example 1 was prepared. The resulting mixture was heat-treated in the same manner as in Section 1-3 of Example 1.

The silica obtained was of a particle form having a particle size ranging from 60 to 240 μm and a true specific gravity of 2.33. The conversion to cristobalite measured by an X-ray diffraction test was 100%. The impurity content was as follows: Al, 0.2 ppm; Ti, 0.1 ppm; Na, 0.1 ppm or less; K, 0.1 ppm or less; Li, 0.1 ppm or less; and U, 0.05 ppb or less.

Using the cristobalite particles thus obtained, the ingot of quartz glass was prepared by the Verneuil's method to find that this ingot contained no bubbles.

What is claimed is:

1. A method for producing a unsintered cristobalite particles comprising heating amorphous silica particles at a temperature of 1400° to 1700° C. in the presence of added cristobalite particles, the amount of said added cristobalite particles being at least 5 parts by weight based on 100 parts by weight of said amorphous silica particles to convert said amorphous silica particles to cristobalite particles with their particle form kept unchanged.

2. A method according to claim 1, wherein the particle size of said amorphous silica particles is in a range of 20 μm to 5 mm.

3. A method according to claim 1, wherein the particle size of said amorphous silica particles is in a range of 50 to 400 μm.

4. A method according to claim 1, wherein the amount of each of aluminum, titanium and an alkali metal contained as impurities in said amorphous silica is 1 ppm or less.

5. A method according to claim 1, wherein said amorphous silica is obtained by either of the following methods:

(a) a method of extruding an aqueous alkali silicate solution having a viscosity ranging from 2 to 500 poises through a nozzle of 1 mm or less in hole diameter into a water-soluble organic medium or an acid solution having a concentration of 4N or less to coagulate the aqueous alkali silicate solution, treating the resulting fibrous or pillar-shaped gel with an acid-containing solution and then washing the gel with water to remove impurities by extraction, or (b) a method of further heat-treating the silica obtained by the above method (a) at a temperature of 1000° C. or more.

6. A method according to claim 1, wherein said amorphous silica particles are such that if they are heat-baked at a temperature of 1200° C. for 4 hours, their percent weight reduction is 1% or less.

7. A method according to claim 1, wherein said amorphous silica particles are such that if they are heat-baked at a temperature of 1200° C. for 4 hours, their percent weight reduction is 0.5% or less.

8. A method according to claim 1, wherein said amorphous silica particles are such that if they are heat-baked at a temperature of 1200° C. for 4 hours, their percent weight reduction is 0.1% or less.

9. A method according to claim 1, wherein the particle size of the added cristobalite particles is in a range of 10 to 400 μm.

10. A method according to claim 1, wherein the particle size of the added cristobalite particles is in a range of 10 to 200 μm.

11. A method according to claim 1, wherein the amount of each of aluminum, titanium and an alkali metal contained as impurities in added cristobalite particles is 1 ppm or less.

12. A method according to claim 1, wherein the amount of the added cristobalite particles is in a range of 5 to 400 parts by weight based on 100 parts by weight of the amorphous silica particle.

13. A method according to claim 1, wherein the amount of the added cristobalite particles in a range of 10 to 100 parts by weight based on 100 parts by weight of the amorphous silica particle.

14. A method according to claim 1, wherein the amount of the added cristobalite particles in a range of 20 to 70 parts by weight based on 100 parts by weight of the amorphous silica particle.

15. A method according to claim 1, wherein the heating temperature for the amorphous silica particles mixed with the added cristobalite particles in a range of 1450° to 1650° C.

16. A method according to claim 1, wherein the heating temperature for the amorphous silica particles mixed with the added cristobalite particles in a range of 1500° to 1600° C.

* * * * *